(12) United States Patent
Yeom et al.

(10) Patent No.: US 8,638,281 B2
(45) Date of Patent: Jan. 28, 2014

(54) DISPLAY APPARATUS INCLUDING AN OPTICAL PLATE AND METHOD OF MANUFACTURING THE SAME

(75) Inventors: Dong-Yeol Yeom, Asan-si (KR); Joong-Hyun Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 668 days.

(21) Appl. No.: 12/623,315

(22) Filed: Nov. 20, 2009

(65) Prior Publication Data

US 2010/0295762 A1 Nov. 25, 2010

(30) Foreign Application Priority Data

Nov. 21, 2008 (KR) .................. 10-2008-0116298

(51) Int. Cl.
 *G09G 3/36* (2006.01)
 *G02B 5/02* (2006.01)
 *F21V 5/02* (2006.01)

(52) U.S. Cl.
 USPC .............................. 345/87; 349/64; 362/620

(58) Field of Classification Search
 USPC .......... 349/64; 362/97.3, 615, 616, 617, 619, 362/620, 628, 242, 246
 See application file for complete search history.

(56) References Cited

U.S. PATENT DOCUMENTS

| | | | | |
|---|---|---|---|---|
| 5,335,100 A | * | 8/1994 | Obata | 349/65 |
| 5,771,328 A | * | 6/1998 | Wortman et al. | 385/146 |
| 7,537,373 B2 | * | 5/2009 | Liao | 362/619 |
| 7,602,459 B2 | * | 10/2009 | Chen et al. | 349/64 |
| 7,841,730 B2 | * | 11/2010 | Hara et al. | 362/19 |
| 7,944,544 B2 | * | 5/2011 | Amako et al. | 349/201 |
| 8,212,963 B2 | * | 7/2012 | Sikiguchi et al. | 349/64 |
| 2003/0030764 A1 | * | 2/2003 | Lee | 349/65 |
| 2005/0141090 A1 | * | 6/2005 | Huang et al. | 359/486 |
| 2006/0146571 A1 | * | 7/2006 | Whitney | 362/615 |
| 2007/0019131 A1 | * | 1/2007 | Choi et al. | 349/65 |
| 2007/0024994 A1 | * | 2/2007 | Whitney et al. | 359/831 |
| 2007/0047953 A1 | * | 3/2007 | Kawai | 396/544 |
| 2007/0230216 A1 | * | 10/2007 | Ite et al. | 362/620 |
| 2008/0089063 A1 | * | 4/2008 | Chen | 362/246 |
| 2008/0101759 A1 | * | 5/2008 | Lee | 385/146 |

FOREIGN PATENT DOCUMENTS

| | | |
|---|---|---|
| JP | 08-286006 | 11/1996 |
| JP | 2002-006118 | 1/2002 |
| JP | 2006-091821 | 4/2006 |
| JP | 2006-201642 | 8/2006 |
| JP | 2006-344409 | 12/2006 |
| JP | 2006-351216 | 12/2006 |
| JP | 2007-003852 | 1/2007 |
| KR | 1020030091901 A | 12/2003 |

OTHER PUBLICATIONS

English machine translation of KR1020030091901 A (Mi Kyung Son, Mosaic Prism Sheet for LCD Back Panel, published Dec. 2003).*

* cited by examiner

*Primary Examiner* — Will J Klimowicz
*Assistant Examiner* — Mark Fischer
(74) *Attorney, Agent, or Firm* — Innovation Counsel LLP

(57) ABSTRACT

A display apparatus including a display panel, a plurality of light sources provided below the display panel to emit light, and an optical plate provided between the display panel and the light sources to diffuse light are disclosed according to one or more embodiments. The optical plate comprises a base including a plurality of regions having different thicknesses, and a convex pattern formed on the base.

23 Claims, 9 Drawing Sheets

DISPLAY APPARATUS INCLUDING AN OPTICAL PLATE AND METHOD OF MANUFACTURING THE SAME

CROSS-REFERENCE TO RELATED APPLICATIONS

This application relies for priority upon Korean Patent Application No. 2008-116298 filed on Nov. 21, 2008, the contents of which are herein incorporated by reference in their entirety.

BACKGROUND

1. Technical Field

The present invention relates to a display apparatus including an optical plate and a method of manufacturing the same. More particularly, the present invention for one or more embodiments relates to a display apparatus including an optical plate provided with a plurality of regions having different thicknesses and a method of manufacturing the same.

2. Related Art

With the development of digital technology, driving mechanisms of display apparatuses have generally been changed from analog to digital. Such a change occurs naturally due to the customer's needs of lightweight display apparatuses, high quality images, and high definition images.

In such a situation, liquid crystal displays lead to the digitalization of the image apparatus into a slim display apparatus having high resolution. In order to expand the market for liquid crystal displays, however, many developers have attempted to develop products having low power consumption and low manufacturing cost.

A liquid crystal display typically comprises a liquid crystal panel and backlight unit. The liquid crystal panel serves as a non-emissive element. The backlight unit serves as a light source to provide light to the liquid crystal panel. In particular, the backlight unit includes a light source provided in the form of a linear light source or a point light source, and an optical sheet, which allows light emitted from the light source to pass through it. The optical sheet converts linear or point light into surface light and increases light brightness.

Currently, the tendency toward a display apparatus having a slim structure, low power consumption, and a low manufacturing cost has led to a light emitting diode being developed as the light source. The light emitting diode is a type of point light source, however, and the density of light it provides to the display panel is generally not uniform. Accordingly, the display apparatus requires an optical plate capable of enhancing uniformity in the density of light emitted from the light source to achieve the slim structure, low power consumption, and low manufacturing cost while obtaining superior display quality.

SUMMARY

Embodiments of the present invention generally provide a display apparatus including an optical plate capable of enhancing uniformity of emitted light and a method of manufacturing the same.

In one embodiment of the present invention, a display apparatus includes a display panel, a plurality of light sources disposed below the display panel to emit light and arranged spaced apart from each other, and an optical plate provided between the display panel and the light sources. The optical plate includes a base. The base includes a plurality of regions that have different thicknesses. The convex pattern is formed on each region of the base.

The plurality of regions are provided in the form of a polygonal pattern and periodically disposed. The regions include a first region having a first thickness and a second region having a second thickness. The first region includes a plurality of first patterns having a first height, and the second region includes a plurality of second patterns having a second height. A difference between the first thickness and the second thickness is equal to or larger than the first height. The first pattern and the second pattern are provided in one form of a pyramid pattern, a lenticular pattern, or a semi-elliptical sphere pattern. In this case, the first pattern and the second pattern have different shapes or even if the first pattern and the second pattern have the same shape, the first patterns and the second patterns are arranged in different directions, so that the first patterns are different from the second patterns. The first pattern is provided in a form of a prism extending in a first direction, and the second pattern is provided in a form of a prism extending in a second direction. The first region and the second region are provided with at least three prisms. According to the first embodiment of the present invention, the first region and the second region each have a width within a range of about 0 microns (μm) to about 300 μm, the first pattern and the second pattern each have a pitch within a range of about 0 μm to about 100 μm, and the first pattern has a pitch equal to or larger than a pitch of the second pattern. The first direction is perpendicular to the second direction. The optical plate is provided in a rectangular plate having a long side and a short side, and the first direction of the first pattern and the second direction of the second pattern are parallel to the long side and the short side, respectively, or parallel to the short side and the long side, respectively. In another embodiment, the first direction of the first pattern and the second direction of the second pattern may form an oblique angle with respect to the long side or the short side of 45 degrees or 135 degrees. The regions and the patterns of the optical plate can be formed corresponding to an arrangement of the light sources. The light sources are arranged in one of a third direction and a fourth direction with a predetermined interval, respectively, in each direction, and the first region and the second region are arranged in one of the third direction and the fourth direction corresponding to the arrangement of the light sources. In this case, if the interval between the light sources in the third direction is shorter than the interval between the light sources in the fourth direction, the region having its pattern in the form of the prism extending in the third direction has a width or an area larger than a width or an area of the region having its pattern in the form of the prism extending in the fourth direction, and if the interval between the light sources in the third direction is longer than the interval between the light sources in the fourth direction, the region having its pattern in the form of the prism extending in the third direction has a width or an area smaller than a width or an area of the region having its pattern in the form of the prism extending in the fourth direction. A center of each of the regions may be disposed above a corresponding light source.

In another embodiment of the present invention, a method of manufacturing an optical plate is provided. According to the method, a first pattern is formed on a base of the optical plate. A photoresist resin is coated on the first pattern. A second pattern is formed on a surface of the photoresist resin, and an area of the photoresist resin corresponding to the first pattern is removed.

The first pattern is formed through an extrusion scheme, and the second pattern is formed through a soft molding scheme. The photoresist resin is partially removed through a photolithography process using a mask including the first region and the second region.

Embodiments of the present invention may provide an optical plate and a method of manufacturing the same, in which the optical plate may uniformly diffuse light even if a point light source such as an LED (light emitting diode) is used. In addition, embodiments of the present invention may provide a high-quality display apparatus capable of improving light efficiency by using the optical plate manufactured by the above method.

BRIEF DESCRIPTION OF THE DRAWINGS

The above and other advantages of embodiments of the present invention will become readily apparent by reference to the following detailed description when considered in conjunction with the accompanying drawings wherein.

DETAILED DESCRIPTION

Figure 1:
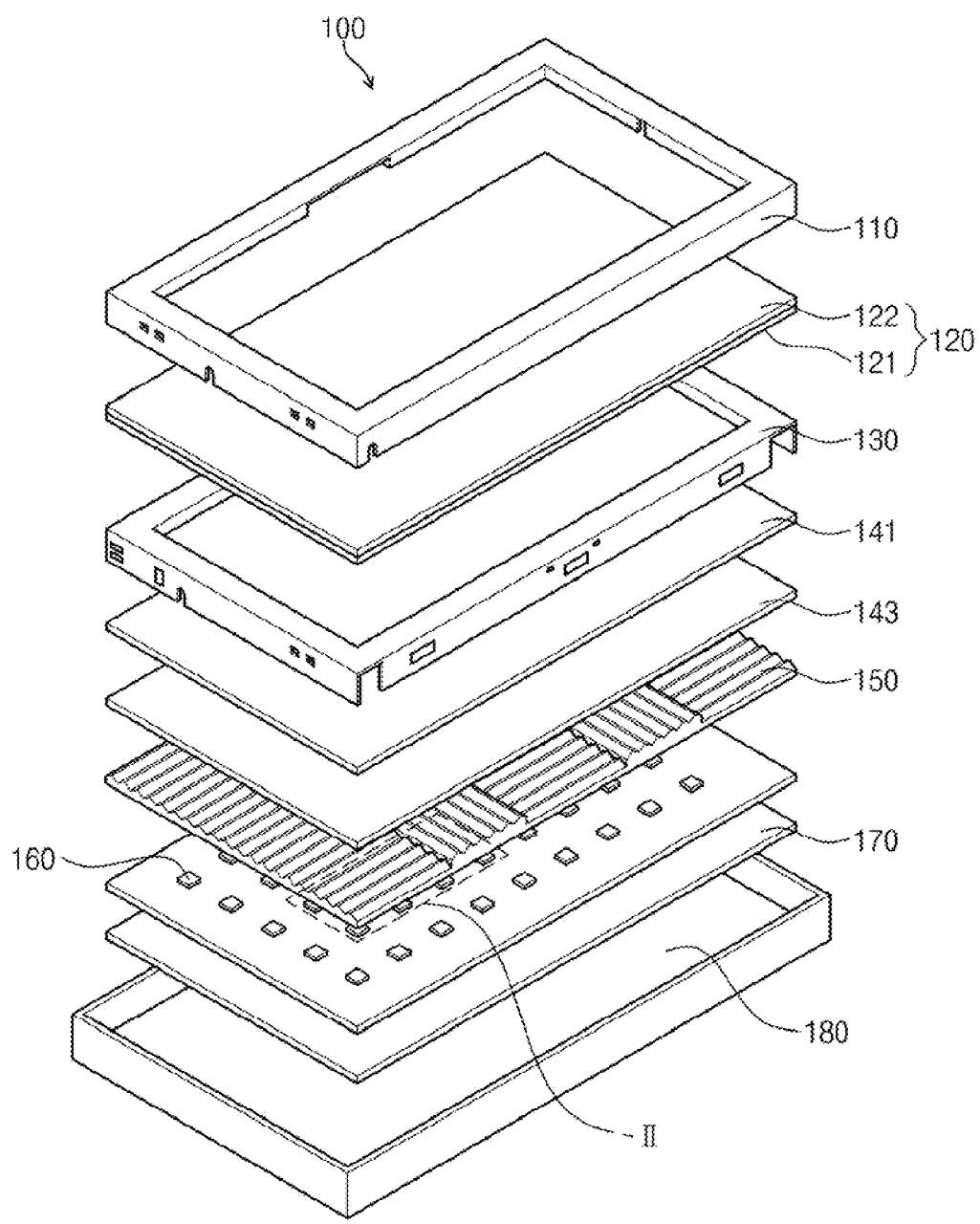
FIG. 1 is an exploded perspective view showing a display apparatus including an optical plate according to an embodiment of the present invention.

Hereinafter, a display apparatus according to embodiments of the present invention will be explained with reference to accompanying drawings. In the following description, a liquid crystal display will be described as a representative example of the display apparatus. Although an LED (light emitting diode) is used as a light source in the liquid crystal display, embodiments of the present invention are not limited thereto. According to other embodiments, various point light sources may be used in the present invention.

It should be understood that embodiments of the present invention are not limited to the appended drawings but include all modifications, equivalents and alternatives within the sprit and scope of the present invention as defined in the following claims. The drawings may be simplified or magnified to clearly express a plurality of layers and regions. In the drawings, the same reference numerals are used to designate the same elements. For the purpose of convenience, an image display direction on the display panel will be referred to as 'an upper direction' or 'a front direction' and an opposite direction thereof will be referred to as 'a lower direction' or 'a rear direction'.

FIG. 1 is an exploded perspective view showing a display apparatus including an optical plate according to one embodiment of the present invention.

As shown in FIG. 1, a display apparatus 100 according to an embodiment of the present invention includes a display panel 120 that displays images in a front direction of the display apparatus 100. A mold frame 130 is provided at edges of the display panel 120 to support the display panel 120. Optical sheets 141, 143, and 150 are provided below the mold frame 130, that is, in a rear direction of the display panel 120. A plurality of light sources 160 (also referred to collectively as "light source" 160) is disposed below the optical sheets 141, 143, and 150, that is, in a rear direction or lateral sides of the optical sheets 141, 143, and 150 to provide light to the display panel 120 through the optical sheets 141, 143, and 150.

Elements configured to provide light to the display panel 120 are referred to as a backlight unit, and the light source 160 and the optical sheets 141, 143, and 150 may be included in the backlight unit.

According to the example embodiment, the backlight unit is provided in the form of a direct illumination type backlight unit in which the light source 160 is disposed below the optical sheets 141, 143, and 150. LED (light emitting diode) serves as the light source 160. The LED is mounted on a board such as a PCB (printed circuit board).

A reflective sheet 170 may be provided below the light source 160 to change a path of light by reflecting the light, which is directed in a specific direction other than the front direction of the display panel 120, such that the light is directed toward the display panel 120.

A lower cover 180 is provided below the reflective sheet 170 to receive the display panel 120, the optical sheets 141, 143, and 150, the light source 160, and the reflective sheet 170 therein. An upper cover 110 is coupled with the lower cover 180. The upper cover 110 is configured to support edges of a front surface of the display panel 120. The upper cover 110 is formed with a display window through which a display area of the display panel 120 is exposed. A coupling device such as a screw hole (not shown) is formed at a side surface of the upper cover 110 such that the coupling device is coupled with the lower cover 180.

Although not shown in the drawings, a printed circuit board connected to a thin film transistor of the display panel 120 may be provided at a side of the display panel 120. Signals output from the printed circuit board may be transmitted to the thin film transistor through interconnections, and the thin film transistor may drive liquid crystals by applying a voltage to a pixel corresponding to the signals.

Various types of display panels may be used without limitation if the display panels can display images. For instance, a liquid crystal display panel or an electrophoretic display panel may be used. According to one embodiment of the present invention, a liquid crystal display panel may be employed as an example of the display panel.

The display panel 120 is provided in the form of a rectangular plate having a long side and a short side. The display panel 120 includes a first substrate 121, a second substrate 122 facing the first substrate 121 and liquid crystals (not shown) formed between the two substrates. The display panel 120 serves to display images in the front direction of the display panel 120 by driving the liquid crystals. In order to drive the liquid crystals, the thin film transistor is formed on the first substrate 121 and a color filter is formed on the second substrate 122. In this case, the two substrates can be referred to as a thin film transistor substrate and a color filter substrate, respectively.

Polarizing plates are provided at rear surfaces of the first and second substrates 121 and 122, respectively, to adjust light transmittance according to alignment of the liquid crystals.

Since the liquid crystals are non-emissive material, the light source 160 is required to display an image. The light irradiated from the light source 160 includes an undesired vibration vector. In order to adjust the vibration vector of the transmission light, the polarizing plates are attached to each surface, respectively, of the display panel 120 such that transmission axes of the polarizing plates cross each other at an angle of 90 degrees. The polarizing plates polarize the light passing through the liquid crystals such that the light has a specific vibration vector. Thus, the intensity of the light varies depending on a rotation degree of a polarization axis of the light while the light is passing through the display panel 120, so that a color having various gray scales, such as black or white, can be expressed.

The mold frame 130 is provided along the edge of the display panel 120. The mold frame 130 may have a substantially rectangular ring shape. The mold frame 130 supports the display panel 120 and the optical sheets 141, 143, and 150. The mold frame 130 is coupled with the lower cover 180 to receive the optical sheets 141, 143, and 150, the light source 160, and the reflective sheet 170 therein. Although one mold frame 130 is illustrated in the drawings, embodiments of the present invention are not limited thereto. According to another embodiment, a plurality of mold frames 130 may be assembled.

The optical sheets 141, 143, and 150 serve to control light emitted from the light source 160. The optical sheets may include an optical plate 150 disposed in a rear direction of the display panel 120. In addition, the optical sheets may include a protective sheet 141 and a prism sheet 143 in addition to the optical plate 150. Although not shown in the drawings, the optical sheets may further include a diffusion sheet.

If necessary, a plurality of optical sheets may be used, and two or three sets of optical sheets may be used by overlapping the optical sheets. In addition, the protective sheet 141 or the prism sheet 143 may be omitted if necessary.

The prism sheet 143 collects light diffused by the optical plate 150 in a direction perpendicular to a plane of the display panel 120. Most of the light passing through the prism sheet 143 travels vertically, so that uniformity in brightness may be obtained.

The protective sheet 141, disposed at the top of the optical sheets 141, 143, and 150, protects the prism sheet 143 that is susceptible to being scratched.

A plurality of light sources 160 are provided below the optical sheets 141, 143, and 150 to provide light to the display panel 120 through the optical sheets 141, 143, and 150. The reflective sheet 170 may be disposed below the light source 160. The reflective sheet 170 reflects light, which is emitted from the light sources 160 and is directed downward from the light source 160, such that the light is directed upward.

As described above, if the display panel is a non-emissive device, such as a liquid crystal display panel, the light source 160 is additionally used to provide light. In this case, as described above, the point light source such as the LED or a lamp in the form of a linear light source such as a CCFL (Cold Cathode Fluorescent Lamp), an EEFL (External Electrode Fluorescent Lamp) and an HCFL (Hot Cathode Fluorescent Lamp) may be used to provide light.

The light source is provided in the form of the point light source or the linear light source. If light emitted from the light source is directly used in the display panel 120, the display panel 120 may show a dark region and a bright region corresponding to the density of emitted light, so that the image quality is degraded. In this regard, it is required to change a light path of the emitted light to enhance the light efficiency. In particular, it is required that the optical plate 150 be able to diffuse light, which is emitted from the point light source and is directed in a specific direction, into various directions.

In the display apparatus, since the LED can be installed in a small space as a point light and has a high light brightness, the LED serves as an effective light source. Because the display panel requires a light in the form of surface light, however, the light uniformity (e.g., the situation in which the image of the light source is not visible from the display panel) of the LED, which is a point light source, may not be realized as desired. In addition, in the case that the light source is provided in the form of a linear light source, the light uniformity also may not be realized as desired in a direction orthogonal to a light emission direction of the linear light source.

In embodiments of the present invention, the optical plate allows light to be emitted at a maximum range in a region having lack of light and prevents light from being emitted in a region having sufficient light by using refraction of light.

Figure 2A:
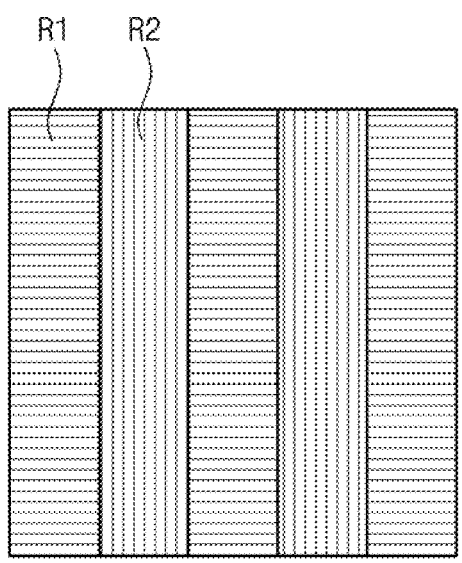
FIG. 2A is a plan view showing an arrangement of a first region and a second region of the optical plate according to an embodiment of the present invention.
Figure 2B:
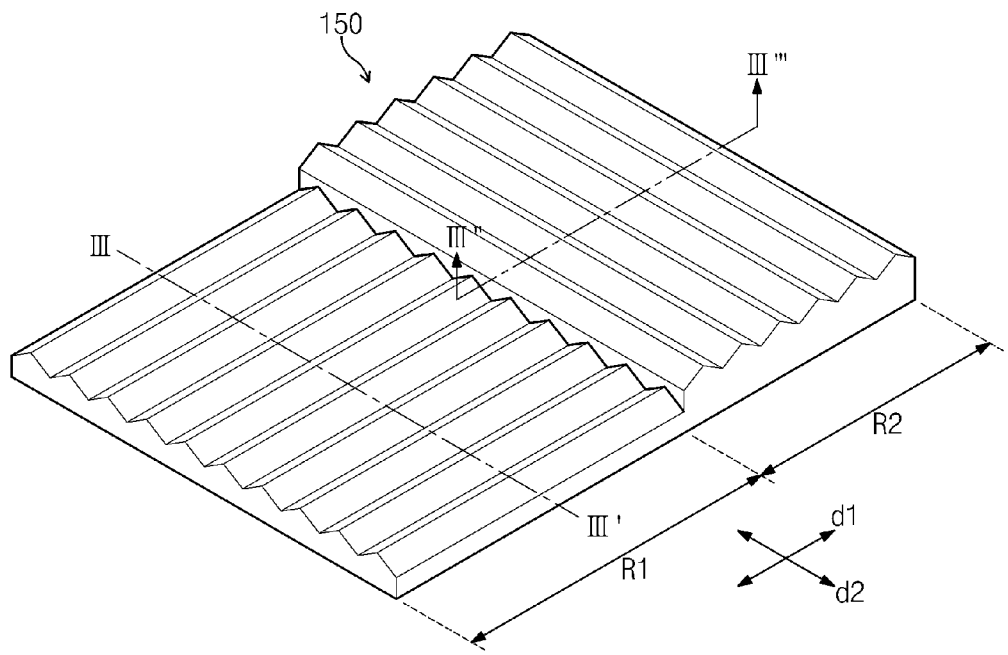
FIG. 2B is an enlarged perspective view showing a part II shown in FIG. 1 according to an embodiment of the present invention.
Figure 3:
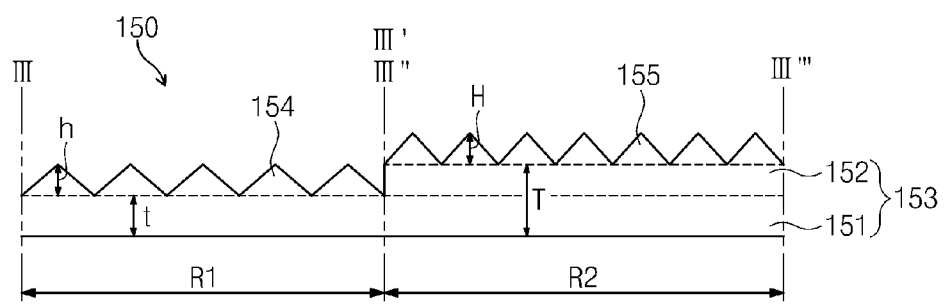
FIG. 3 is a sectional view taken along lines III-III' and III"-III'" shown in FIG. 2B according to an embodiment of the present invention.

FIG. 2A is a plan view showing an arrangement of a first region and a second region of the optical plate according to a first embodiment of the present invention, and FIG. 2B is an enlarged perspective view showing a part II shown in FIG. 1 according to an embodiment. FIG. 3 is a cross-sectional view taken along lines III-III' and III"-III'" of FIG. 2B according to an embodiment.

The optical plate 150 according to an embodiment of the present invention comprises a base 153 that includes bases 151 and 152, which are provided in the form of rectangular plates having long sides and short sides, and convex patterns 154 and 155 formed on the bases 151 and 152.

The bases 151 and 152 include an upper surface and a lower surface facing each other and protrude from the lower surface toward the display panel 120 with different heights, so the bases 151 and 152 have different thicknesses t and T. A plurality of regions may be periodically repeated.

According to one embodiment of the present invention, the optical plate 150 includes a plurality of first regions R1 and a plurality of second regions R2. The first regions R1 and the second regions R2 may be arranged to regularly repeat and may alternate with one another. The first and second regions R1 and R2 may be arranged to repeat in a one-dimensional direction, e.g., a transverse direction or a longitudinal direction. Accordingly, the first region R1 and the second region R2 may extend in one direction and may be alternately disposed. According to another embodiment of the present invention, three different regions may be provided.

The convex patterns 154 and 155 are provided on the first regions R1 and the second regions R2, respectively. The first regions R1 and the second regions R2 have a first thickness t and a second thickness T, respectively. The convex pattern formed on the first region R1 represents a first pattern 154 and the convex pattern formed on the second region R2 represents a second pattern 155. If a height of the first pattern 154 is h and a height of the second pattern 155 is H, a difference between the second thickness T and the first thickness t is equal to or larger than the first height h. In other words, the thickness T of the second region R2 measured from one surface of the base is larger than the thickness t of the first region R1, and the thickness difference between the first region R1 and the second region R2 is equal to or larger than the height h of the pattern formed on the first region R1. Such a thickness difference may be caused by the second pattern 155 being formed after the first pattern 154 has been covered.

The convex patterns 154 and 155 are provided in such a manner that a plurality of prisms extend in a predetermined direction. On the assumption that the prisms extend in a predetermined direction, a cross section of the prism has a triangular shape when viewed in the direction perpendicular to the extension direction of the prisms. The shape, however, of the convex patterns 154 and 155 is not limited to triangular prisms. According to another embodiment, the first and second patterns 154 and 155 may be provided in various forms such as a pyramid pattern, a lenticular pattern, and a semi-elliptical sphere pattern.

The first convex pattern 154 and the second convex pattern 155 may have shapes different from each other. One reason why the convex patterns 154 and 155 may have different shapes is to adjust the diffusion degree using different patterns, because the light density may vary depending on the arrangement of the light sources.

As shown in the drawings, when the convex patterns 154 and 155 are provided in the form of prisms, the first pattern 154 extends in a first direction d1, the second pattern 155 extends in a second direction d2, and an angle formed between the first direction d1 and the second direction d2 may be changed corresponding to the amount or density of light introduced from the light source to the bases 151 and 152 of the optical plate 150. For example, when the light sources 160 are arranged in the form of a lattice pattern, spaced apart from each other, the first direction d1 may be perpendicular to the second direction d2.

In this case, many prisms can be provided in the first region R1 and the second region R2, which serve as unit regions. If necessary, at least three prisms may be formed in the unit region. In order to allow the first region R1 and the second region R2 to clearly perform the light diffusion functions, the prism must have at least one mountain and valley. Accordingly, in order to form at least one prism, at least three first patterns 154 and at least three second patterns 155 must be provided by taking a margin process into consideration, as further described below.

According to one embodiment of the present invention, the first region R1 and the second region R2 each have a pitch within a range of about 0 μm to about 300 μm. The pitch represents a distance between unit regions or between patterns that are periodically arranged and the pitch corresponds to a value which minimizes moire effect by the repeated regions. The pixel used in display panel 120 has a pitch of about 300 μm to about 600 μm and the prism sheet 143 has a pitch of about 50 μm to 250 μm, so that the region may have a pitch of about 300 μm or less.

In addition, at least three prisms are disposed in the repeated region, so that the prism has a pitch of about 0 μm to about 100 μm.

In this case, the prism of the first pattern 154 has a size equal to or larger than that of the prism of the second pattern 155. That is, the first pattern 154 has a pitch equal to or larger than that of the second pattern 155, and the first pattern 154 has a height h equal to or larger than that, H, of the second pattern 155. If the first pattern 154 disposed at a relatively low location has a pitch and a height smaller than those of the second pattern 155, respectively, a step difference is formed between the first pattern 154 and the second pattern 155, so that the first pattern 154 can not control light passed through a sidewall of a boundary of the first region R1 and the second region R2. Accordingly, the light passed through the sidewall of the boundary may be leaked, so uncontrolled light is provided toward the display panel 120, thereby degrading the light uniformity. Accordingly, the two patterns 154 and 155 may have the same sizes or the second pattern 155, disposed at a higher location, may have a size smaller than that of the first pattern 154.

A width and an area of the first region R1 and the second region R2 may be changed corresponding to the arrangement of the light sources 160. Since the LEDs are point light sources, in general, the LEDs are regularly arranged in a lattice pattern, spaced apart from each other. When the light sources 160 are arranged in the form of the lattice, if the light sources 160 are spaced apart from each other at equidistance, i.e. intervals between the light sources are the same, the first region R1 and the second region R2 may have the same shape, size, and width. When the light sources 160 are periodically arranged, spaced apart from each other, and if the light sources 160 are irregularly spaced apart from each other, (i.e. intervals between the light sources are different), the first region R1 may have a size that is different from that of the second region R2, region R1 may have a width different from that of region R2, the pattern formed on the region R1 may have a different shape from that formed on the region R2, or any combination of the foregoing. In this case, the first region R1 and the second region R2 may be periodically or alternately repeated in one of the first direction d1 and the second direction d2, corresponding to the arrangement of the light sources 160.

Figure 4A:
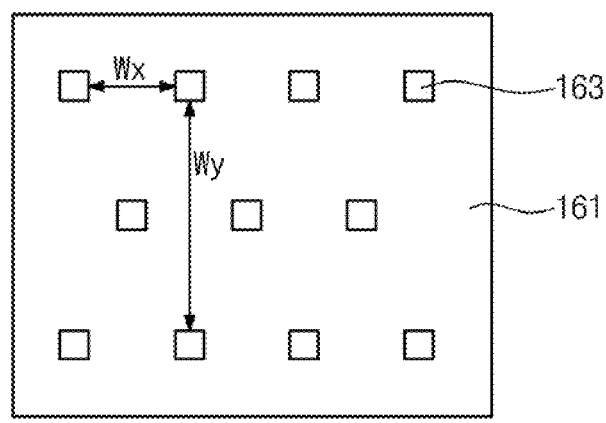
FIG. 4A and FIG. 4B are views showing an arrangement of point light sources in which a long side of the optical plate is disposed in an x-axis direction and a short side of the optical plate is disposed in a y-axis direction according to one or more embodiments of the present invention.
Figure 4B:
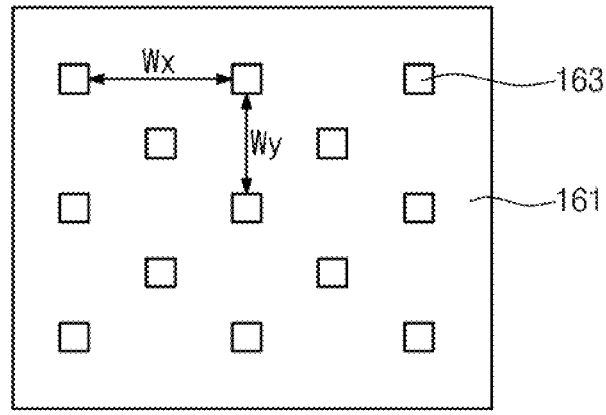

FIG. 4A and FIG. 4B are views showing an arrangement of point light sources in which a long side of the optical plate is disposed in an x-axis direction and a short side of the optical plate is disposed in a y-axis direction according to one or more embodiments. Light sources 163 are mounted on a board 161 such as a printed circuit board.

FIG. 4A is a plan view showing a case in which the interval between the light sources arranged in the x-axis direction is shorter than the interval between the light sources arranged in the y-axis direction, and FIG. 4B is a plan view showing a case in which the interval between the light sources arranged in the x-axis direction is longer than the interval between the light sources arranged in the y-axis direction.

As shown in FIG. 4A, when a light distribution in the x-axis direction is compared with a light distribution in the y-axis direction, the interval Wx between the light sources arranged in the x-axis direction is relatively short, so that the dark regions formed between the light sources are relatively small and the light density is relatively high. Meanwhile, since the interval Wy between the light sources arranged in the y-axis direction is relatively long, the dark regions formed between the light sources are relatively large and the light density is relatively low. Accordingly, more light needs to be diffused in the y-axis direction. In this regard, if the first region of the optical plate has the first pattern provided in the form of the prism extending in the x-axis direction and the second region of the optical plate has the second pattern provided in the form of the prism extending in the y-axis direction, the width of the first region R1 is larger than the width of the second region R2 to diffuse a larger quantity of light in the y-axis direction.

On the other hand, as shown in FIG. 4B, when a light distribution in the x-axis direction is compared with a light distribution in the y-axis direction, the interval Wx between the light sources arranged in the x-axis direction is relatively long so that the dark regions between the light sources are relatively large and the light density is relatively low. Likewise, since the interval Wy between the light sources arranged in the y-axis direction is relatively short, the dark regions between the light sources are relatively small and the light density is relatively high. Accordingly, more light needs to be diffused in the x-axis direction. In this regard, the width of the second region R2 is larger than the width of the first region R1 to diffuse a larger quantity of light in the x-axis direction.

To summarize, if the arrangement directions of a plurality of light sources correspond to the x-axis and the y-axis, respectively, when the interval between the light sources arranged in the x-axis direction is shorter than the distance between the light sources arranged in the y-axis direction, the region having patterns extending in the x-axis direction have a width or an area larger than that of the patterns extending in the y-axis direction. Likewise, when the interval between the light sources arranged in the x-axis is longer than the interval between the light sources arranged in the y-axis direction, the region having patterns extending in the x-axis direction have a width or an area smaller than that of the patterns extending in the y-axis direction.

The light sources may be disposed corresponding to the patterns, that is, the center of the patterns may be disposed above the corresponding light sources.

The variation of the width or the area of the regions is not only applicable for the point light source, but is also applicable for a linear light source. In the case of the linear light source, since the difference in light density is large in one of the x-axis and y-axis directions, the widths of the regions may be adjusted corresponding to the light density.

The above embodiments have been described such that the first and second directions, d1 and d2, which are extension directions of the pattern, are x-axis and y-axis directions, respectively, but embodiments of the present invention are not thusly limited. According to another embodiment of the present invention, the first and second directions, or extension directions, may be inclined (e.g., oriented or forming an oblique angle) at an angle, for example, of 45 degrees (or 135 degrees) relative to the x-axis and y-axis directions, respectively.

In addition, the shape of the first and second regions R1 and R2 according to example embodiments of the present invention is for illustrative purposes only, and the first and second regions R1 and R2 may be embodied with various shapes. When the light sources 163 are arranged in a lattice pattern, if the light sources 163 are spaced from each other at equidistance, the shape, the size, and the width of the first region R1 may be identical to those of the second region R2. However, if the light sources 163 are spaced from each other at an irregular interval, the first and second regions R1 and R2 may have various shapes, sizes, and widths.

Figure 5:
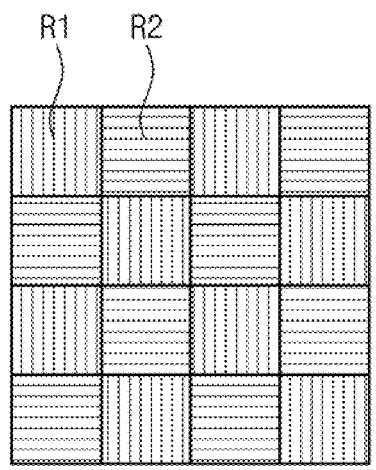
FIG. 5 is a plan view showing an arrangement of a first region and a second region according to an embodiment of the present invention.
Figure 6:
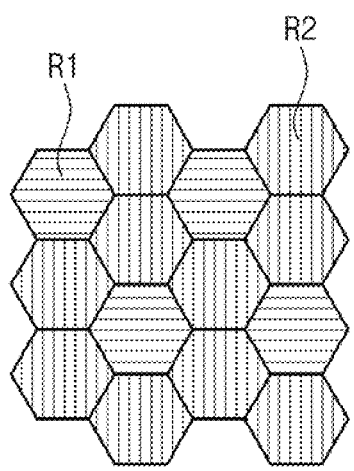
FIG. 6 is a plan view showing an arrangement of a first region and a second region according to another embodiment of the present invention.

FIG. 5 and FIG. 6 show a plurality of regions having various shapes and sizes, that is, the first and second regions R1 and R2 according to a second and a third embodiment of the present invention.

Referring to the embodiment shown in FIG. 5, the first and second regions R1 and R2 are repeatedly formed in two-dimensional directions. In other words, the first and second regions R1 and R2 extend in the transverse and longitudinal directions while forming a lattice pattern or a check pattern as a whole. In this example, each region has a square shape or a rectangular shape.

Referring to the embodiment shown in FIG. 6, the first and second regions R1 and R2 are repeatedly formed in two-dimensional directions, and each region has a hexagonal shape. Although the regions may have the strip shape, the rectangular (square) shape, or the hexagonal shape, embodiments of the present invention are not limited to those shapes. The regions may have, for example, triangular shapes or pentagonal-hexagonal shapes.

Referring to FIG. 4, in the second embodiment or the third embodiment, the width or the area of the first and second regions R1 and R2 may vary depending on the interval between the light sources 163.

The optical plate having the above structure diffuses light uniformly, which is generated from point light sources or a linear light source, into surface light, which may be supplied to the display panel. Especially, when the point light sources are arranged at different intervals, the region or the pattern may be formed on the optical plate corresponding to the irregular interval of the point light sources, thereby uniformly diffusing the light.

FIG. 7A through FIG. 7D are views showing light uniformity obtained by using conventional optical plates and by using optical plates according to one or more embodiments of the present invention. LEDs are used as the light sources, in which an interval between the light sources in the x-axis direction is 30 mm, an interval between the light sources in the y-axis direction is 40 mm, and rows of the light sources are offset from each other.

Figure 7A:
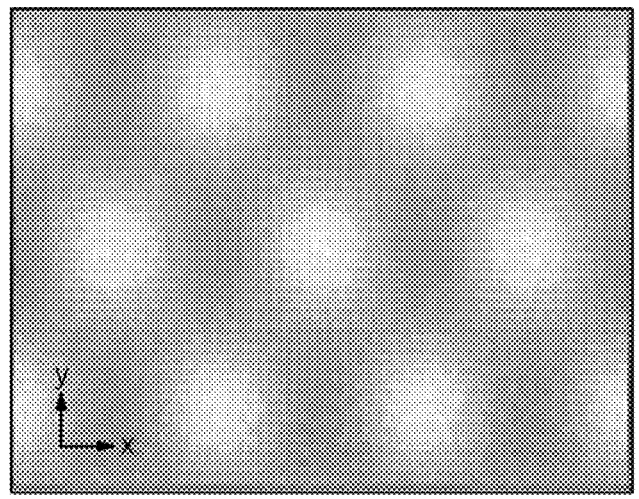
FIG. 7A through FIG. 7D are views for comparison showing light uniformity obtained using conventional optical plates and using optical plates according to one or more embodiments of the present invention.

FIG. 7A is a view showing distribution of light which is output through the display panel when the optical plate without a prism is used. As shown in FIG. 7A, light uniformity is very low, so the position of the point light sources can be recognized.

Figure 7B:
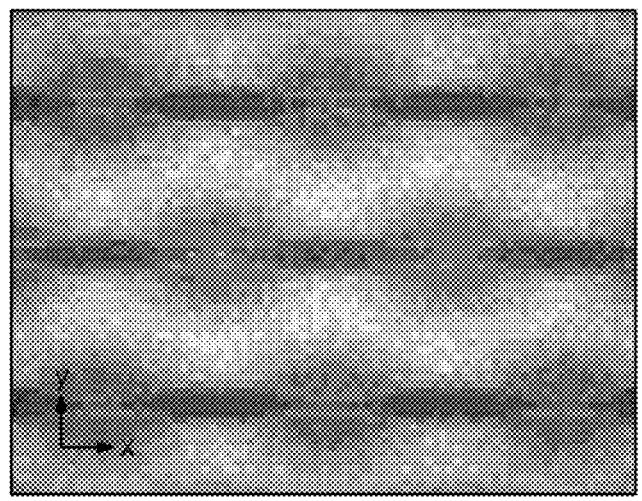

FIG. 7B is a view showing distribution of light which is output through the display panel when the optical plate having the conventional prism is used. In this case, the pitch of the prism is 20 μm, and the prism extends in the x-axis direction. Referring to FIG. 7B, the light uniformity is improved in the x-axis direction, but the light uniformity is rarely improved in the y-axis direction. Furthermore, light deviation is increased in the y-axis direction.

Figure 7C:
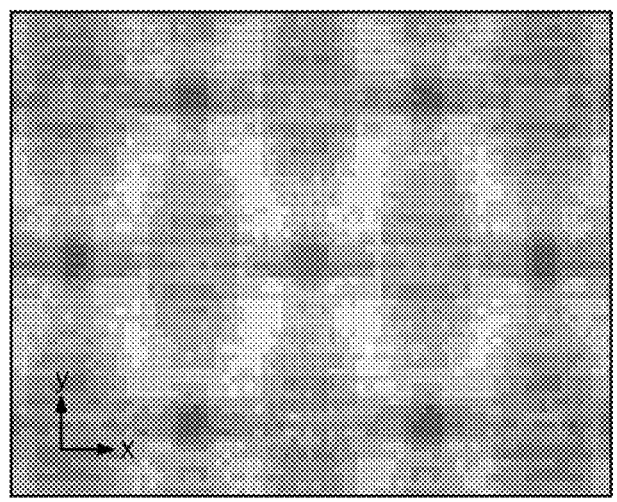

FIG. 7C is a view showing distribution of light which is output through the display panel when the optical plate according to the first embodiment is used. In this case, the first and second regions have widths of 100 μm, the pitch of the prism is 20 μm in the first and second regions, and the prism has a regular triangular section. The first and second patterns are directed at an angle of 0 degrees and 90 degrees on the basis of the x-axis. As shown in FIG. 7C, the light uniformity is improved in the x-axis and y-axis directions.

Figure 7D:
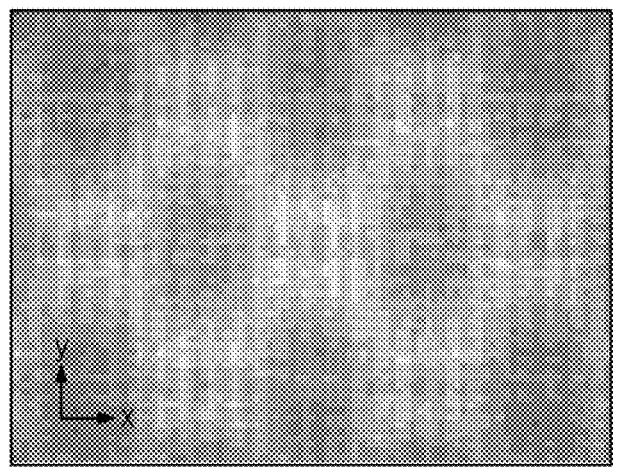

FIG. 7D is a view showing distribution of light which is output through the display panel when the optical plate according to the second embodiment is used. In this case, the first region has an area of 100 μm×100 μm, the second region has an area of 100 μm×100 μm, and the pitch of the prism is 20 μm in the first and second regions, respectively. The first and second patterns are directed at an angle of 0 degrees and 90 degrees on the basis of the x-axis and the prism has a regular triangular section. As shown in FIG. 7D, the light uniformity is improved in the x-axis and y-axis directions.

A method of manufacturing the optical plate having the above structure in accordance with an embodiment will now be described with reference to FIG. 8A through FIG. 8E. FIG. 8A through FIG. 8E are cross-sectional views sequentially showing a method of manufacturing an optical plate according to an embodiment of the present invention. For the purpose of explanation, the sections of the optical plate shown in FIG. 8A through FIG. 8E correspond to the sections taken along lines III-III' and III''-III''' of FIG. 3. The manufacturing method will be described with respect to an optical plate according to one embodiment of the present invention (see, e.g., FIG. 1), and redundant explanation will be omitted.

Figure 8A:
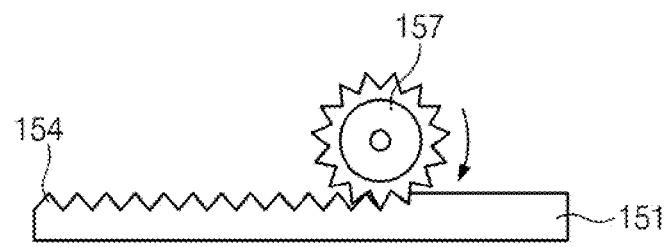
FIG. 8A through FIG. 8E are views sequentially showing a method of manufacturing an optical plate according to an embodiment of the present invention.

As seen in FIG. 8A, the first pattern 154 may be formed on the front surface of the base 151 of the optical plate 150. The first pattern 154 may be formed through an extrusion scheme. In order to form the first pattern 154 through the extrusion scheme, a master roll 157 is prepared to transfer the first pattern 154 on the front surface of the base 151. The master roll 157 has a reverse pattern thereon corresponding to the first pattern 154. The master roll 157 is rotated while pressing a material for the optical plate 150. Thus, the reverse pattern is transferred to the surface of the material of the optical plate 150, thereby forming the first pattern 154 on the surface of the optical plate 150.

Although the base 151 shown in FIG. 8A has a flat structure, embodiments of the present invention are not limited thereto. According to another embodiment of the present invention, the base 151 may be arranged between a plurality of rollers or may be partially wound around the master roll 157.

The master roll 157 may be of a cylindrical roller. The prism pattern may be formed on the surface of the cylindrical roller by scraping the surface of the cylindrical roller in the axial direction using a diamond bit. The master roll 157 may be formed with a pattern extending in one direction. In this case, the reverse pattern can be easily formed on the master roll 157.

Figure 8B:
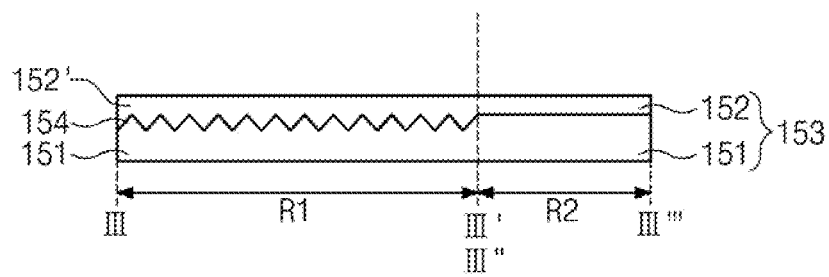

Referring now to FIG. 8B, the second pattern 155 may be formed on the optical plate 150 having the first pattern 154. The second pattern 155 is formed through a soft mold scheme. In order to form the second pattern 155, photoresist resins 152 and 152' may be coated on the entire surface of the optical plate having the first pattern 154.

Figure 8C:
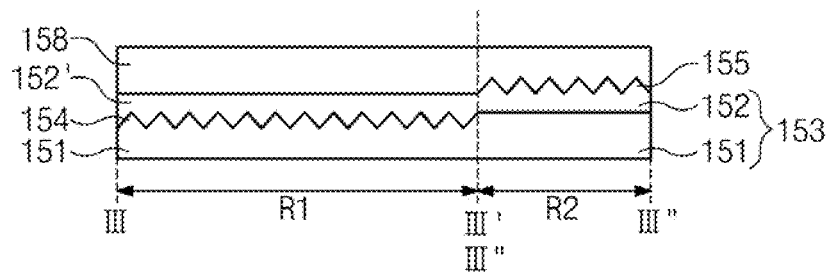

Referring now to FIG. 8C, a master mold 158 may press the photoresist resins 152 and 152', thereby forming the second pattern 155. Since the master mold 158 is formed with the reverse pattern corresponding to the second pattern 155 on the surface of master mold 158, the reverse pattern formed on the master mold 158 is transferred to the surface of the photoresist resins 152 and 152' when the master mold 158 presses the photoresist resins 152 and 152'.

Figure 8D:
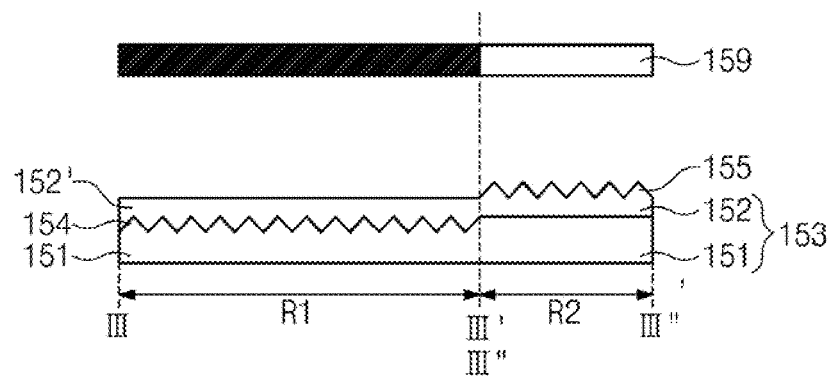

Referring now to FIG. 8D, the surface of the photoresist resins 152 and 152' having the second pattern 155 may be patterned through the photolithography process, thereby forming the first and second regions R1 and R2. The photoresist resins 152 and 152' may include photosensitive polymer which reacts with light, such as ultraviolet rays. Then, the photoresist resins 152 and 152' with the second pattern 155 formed on their surface may be subjected to the exposure process. When the exposure process is performed, a mask 159 having the first and second regions R1 and R2 may be employed.

Figure 8E:
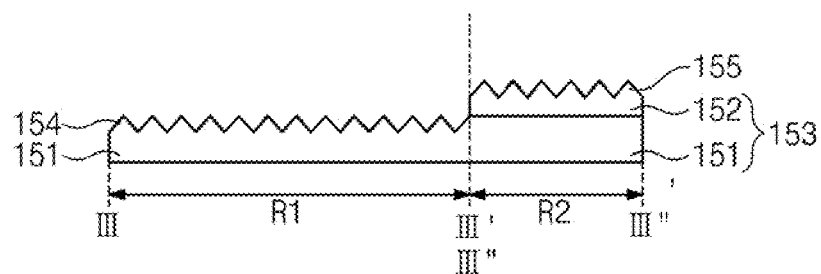

Referring now to FIG. 8E, after the exposure process, the photoresist resins 152 and 152' may be developed and stripped. One of the first and second regions R1 and R2 may serve as a light transmission area of mask 159 and the other may serve as a light blocking area of mask 159, which may vary depending on the property (negative or positive) of the photoresist resins 152 and 152'. Thus, some of the photoresist resins 152 and 152' is exposed to the light, and the remaining is not exposed to the light due to the first and second regions R1 and R2, so that the stripping of the photoresist resins 152 and 152' may vary depending on the result of the exposure process. According to one embodiment of the present invention, the photoresist resin 152' corresponding to the first region R1 may be removed. The remaining photoresist resin 152 may serve as a part of the base.

The pattern formed in the first and second regions R1 and R2 may be a prism pattern. The number of prism patterns formed in the first and second regions R1 and R2 may vary according to one or more embodiments. According to one embodiment of the present invention, at least three prisms may be arranged in the first and second regions R1 and R2, respectively. Since the first and second regions R1 and R2 are patterned through the photolithography process, it is necessary to consider a margin in order to form a predetermined number of prisms. In other words, at least one prism mountain and valley are required to realize the light diffusion effect. However, the prisms may not be formed according to the original design due to the exposure process, which requires the mask alignment, and the stripping process. If the first and second regions R1 and R2 are patterned through the photolithography process by taking one or two prisms into consideration, the second region R2 may cover a part of the first region R1, so the mountain and the valley of the prism may not appear.

As shown in FIG. 1, the optical plate manufactured through the above process may be disposed between the display panel and the light sources to supply light to the display panel by improving efficiency of light output from the light sources. The optical plate according to embodiments of the present invention may improve the light distribution effect, so that uniformity of light output from the light sources is improved. In addition, according to one or more embodiments of the present invention, a plurality of patterns can be easily formed in the optical plate through a simple process, so that manufacturing time and manufacturing cost can be reduced. For example, two types of patterns may not be easily formed on the master roll, so the manufacturing time and the manufacturing cost may be increased in the related art compared to embodiments of the present invention. Embodiments of the present invention, however, can be realized with a single pattern. If a plurality of patterns are necessary, other patterns can be formed through the soft molding and photolithography schemes.

Although embodiments of the present invention have been described as examples, it should be understood that the present invention should not be limited to these embodiments but that one of ordinary skill in the art may make various changes and modifications within the spirit and scope of the present invention as hereinafter claimed.

For instance, although one or more embodiments of the present invention provide the optical plate having two types of patterns, three or more types of patterns may be formed with different heights.

What is claimed is:

1. A display apparatus comprising:
a display panel;
a plurality of light sources disposed below the display panel to emit light and arranged spaced apart from each other; and
an optical plate provided between the display panel and the light sources,
wherein the optical plate comprises:
a base including a first region and a second region, the first region including a first base region having a first uniform thickness and the second region including a second base region having a second uniform thickness thicker than the first uniform thickness, and
first convex patterns and second convex patterns performing a light diffusion function and formed on the first base region and the second base region, respectively,
wherein the first uniform thickness is a thicknesses from a bottom of the base to a valley of the first convex pattern, and the second uniform thickness is a thicknesses from the bottom of the base to a valley of the second convex pattern, wherein the first convex patterns have linearly extending apexes extending in a first direction and the second convex patterns have linearly extending apexes extending in a second direction substantially perpendicular to the first direction, and wherein the first convex patterns have a first height, the second convex patterns have a second height, and a difference between the first uniform thickness and the second uniform thickness is equal to or larger than the first height.

2. The display apparatus of claim 1, wherein the optical plate is provided as a rectangular plate having a long side and a short side, and the first direction and the second direction are parallel to the long side and the short side, respectively, or parallel to the short side and the long side, respectively.

3. The display apparatus of claim 1, wherein the optical plate is provided as a rectangular plate having a long side and a short side, and the first direction forms an angle with respect to the long side or the short side of 45 degrees or 135 degrees and the second direction forms an angle with respect to the long side or the short side of 45 degrees or 135 degrees.

4. The display apparatus of claim 1, wherein:
the light sources are arranged spaced apart from each other with a first interval between light sources in the first direction and a second interval between light sources in the second direction, the first interval being shorter than the second interval;
the first region and the second region are alternatingly arranged in the first direction, and
a region having the convex patterns having linearly extending apexes extending in the first direction has a width or an area larger than a width or an area of a region having the convex patterns having linearly extending apexes extending in the second direction.

5. The display apparatus of claim 4, wherein the first region and the second region comprise at least three prisms.

6. The display apparatus of claim 5, wherein a pitch of the first convex patterns is equal to or larger than a pitch of the second convex patterns.

7. The display apparatus of claim 6, wherein the first convex patterns and the second convex patterns each have a pitch equal to or less than about 100 μm.

8. The display apparatus of claim 7, wherein the first region has a width equal to or less than about 300 μm and the second region has a width equal to or less than about 300 μm.

9. The display apparatus of claim 4, wherein a pitch of the first convex patterns is equal to or larger than a pitch of the second convex patterns.

10. The display apparatus of claim 9, wherein the first convex patterns and the second convex patterns each have a pitch equal to or less than about 100 μm.

11. The display apparatus of claim 10, wherein the first region has a width equal to or less than about 300 μm and the second region has a width equal to or less than about 300 μm.

12. The display apparatus of claim 4, wherein the first convex patterns and the second convex patterns each have a pitch equal to or less than about 100 μm.

13. The display apparatus of claim 12, wherein the second convex patterns comprises a photoresist resin.

14. The display apparatus of claim 1, wherein the first region and the second region each include a polygonal shape and are alternately disposed.

15. The display apparatus of claim 1, wherein the first region and the second region comprise at least three prisms.

16. The display apparatus of claim 15, wherein a pitch of the first convex patterns is equal to or larger than a pitch of the second convex patterns.

17. The display apparatus of claim 16, wherein the first convex patterns and the second convex patterns each have a pitch equal to or less than about 100 μm.

18. The display apparatus of claim 17, wherein the second convex patterns comprises a photoresist resin.

19. The display apparatus of claim 15, wherein the first convex patterns and the second convex patterns each have a pitch equal to or less than about 100 μm.

20. The display apparatus of claim 19, wherein the second convex patterns comprises a photoresist resin.

21. The display apparatus of claim 1, wherein a pitch of the first convex patterns is equal to or larger than a pitch of the second convex patterns.

22. The display apparatus of claim 21, wherein the first convex patterns and the second convex patterns each have a pitch equal to or less than about 100 μm.

23. The display apparatus of claim 1, wherein the first convex patterns and the second convex patterns each have a pitch equal to or less than about 100 μm.

* * * * *